(12) United States Patent
Kim et al.

(10) Patent No.: US 10,755,714 B2
(45) Date of Patent: *Aug. 25, 2020

(54) QUERY ENDPOINTING BASED ON LIP DETECTION

(71) Applicant: Google LLC, Mountain View, CA (US)

(72) Inventors: Chanwoo Kim, San Jose, CA (US); Rajeev Conrad Nongpiur, Palo Alto, CA (US); Michiel A. U. Bacchiani, Summit, NJ (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/412,677

(22) Filed: May 15, 2019

(65) Prior Publication Data
US 2019/0333507 A1 Oct. 31, 2019

Related U.S. Application Data

(63) Continuation of application No. 15/458,214, filed on Mar. 14, 2017, now Pat. No. 10,332,515.

(51) Int. Cl.
*G10L 15/22* (2006.01)
*G06F 40/30* (2020.01)
(Continued)

(52) U.S. Cl.
CPC .......... *G10L 15/22* (2013.01); *G06K 9/00255* (2013.01); *G10L 15/04* (2013.01);
(Continued)

(58) Field of Classification Search
CPC ............ G10L 15/22; G10L 15/00; G06F 3/16
See application file for complete search history.

(56) References Cited

U.S. PATENT DOCUMENTS

| 5,553,119 A | 9/1996 | McAllister et al. |
| 5,621,858 A | 4/1997 | Stork et al. |

(Continued)

FOREIGN PATENT DOCUMENTS

| EP | 1748387 | 1/2007 |
| EP | 1443498 | 3/2008 |

OTHER PUBLICATIONS

Aoki et al., Voice activity detection by lip shape tracking using EBGM, MM '07 Proceedings of the 15th ACM international conference on Multimedia, dated Sep. 2007, 4 pages.

(Continued)

*Primary Examiner* — Shreyans A Patel
(74) *Attorney, Agent, or Firm* — Middleton Reutlinger

(57) ABSTRACT

Systems and methods are described for improving endpoint detection of a voice query submitted by a user. In some implementations, a synchronized video data and audio data is received. A sequence of frames of the video data that includes images corresponding to lip movement on a face is determined. The audio data is endpointed based on first audio data that corresponds to a first frame of the sequence of frames and second audio data that corresponds to a last frame of the sequence of frames. A transcription of the endpointed audio data is generated by an automated speech recognizer. The generated transcription is then provided for output.

20 Claims, 5 Drawing Sheets

(51) Int. Cl.
*G10L 15/04* (2013.01)
*G10L 25/78* (2013.01)
*G10L 15/25* (2013.01)
*G06K 9/00* (2006.01)
*G10L 15/26* (2006.01)

(52) U.S. Cl.
CPC ............ *G10L 15/25* (2013.01); *G10L 15/265* (2013.01); *G10L 25/78* (2013.01); *G10L 2015/223* (2013.01)

(56) References Cited

U.S. PATENT DOCUMENTS

| | | | | |
|---|---|---|---|---|
| 5,838,678 | A * | 11/1998 | Davis | H04N 21/23608 370/389 |
| 5,884,257 | A | 3/1999 | Maekawa et al. | |
| 6,449,591 | B1 * | 9/2002 | Kondo | G06K 9/00221 704/222 |
| 2003/0144844 | A1 | 7/2003 | Colemenarex et al. | |
| 2003/0171932 | A1 * | 9/2003 | Juang | G10L 15/24 704/276 |
| 2004/0117191 | A1 * | 6/2004 | Seshadri | G10L 15/25 704/275 |
| 2004/0120554 | A1 * | 6/2004 | Lin | G06K 9/00335 382/118 |
| 2004/0243416 | A1 | 12/2004 | Gardos | |
| 2005/0068584 | A1 * | 3/2005 | Kawaoka | G06T 11/60 358/1.18 |
| 2007/0092224 | A1 * | 4/2007 | Tsukagoshi | H04N 5/4401 386/202 |
| 2007/0136071 | A1 * | 6/2007 | Lee | G10L 15/25 704/270 |
| 2007/0153089 | A1 * | 7/2007 | Cooper | G06K 9/00335 348/194 |
| 2008/0037837 | A1 | 2/2008 | Noguchi et al. | |
| 2011/0007797 | A1 * | 1/2011 | Palmer | G11B 27/034 375/240.01 |
| 2011/0080529 | A1 | 4/2011 | Wong | |
| 2011/0164105 | A1 | 7/2011 | Lee et al. | |
| 2014/0149754 | A1 | 5/2014 | Silva et al. | |
| 2015/0019206 | A1 * | 1/2015 | Wilder | G06K 9/00302 704/9 |
| 2016/0314789 | A1 * | 10/2016 | Marcheret | G10L 15/25 |
| 2017/0287472 | A1 | 10/2017 | Ogawa et al. | |
| 2018/0268812 | A1 | 9/2018 | Kim et al. | |

OTHER PUBLICATIONS

Aung et al. "Robust Visual Voice Activity Detection Using Long-Short-Term Memory Recurrent Neural Network," Network and Parallel Computing; Lecture notes in computer science, Springer International Publishing, Feb. 4, 2016, 12 pages.

International Search Report issued in International Application No. PCT/US2017/059037, dated Jan. 26, 2018, 16 pages.

Office Action issued in British Application No. GB1717843.5, dated Apr. 30, 2018, 5 pages.

Written Opinion issued in International Application No. PCT/US2017/059037, dated Jun. 26, 2018, 7 pages.

United Kingdom Intellectual Property Office; Intention to Grant Application No. GB1717843.5; 2 pages; dated Feb. 7, 2020.

Germany Intellectual Property Office; Notice of Office action issue in Application No. 102017126396; 6 pages; dated May 15, 2020.

United Kingdom Intellectual Property Office; Combined Search and Examination Report; Application No. GB2003401.3; 5 pages; dated Jun. 22, 2020.

* cited by examiner

QUERY ENDPOINTING BASED ON LIP DETECTION

CROSS-REFERENCE TO RELATED APPLICATIONS

This application is a continuation of U.S. application Ser. No. 15/458,214, filed Mar. 14, 2017, the contents of which are incorporated by reference herein.

FIELD

This specification generally relates to automated speech recognition (ASR).

BACKGROUND

Automated speech recognition (ASR) is often used to facilitate the completion of tasks and/or commands that are provided by a user. For example, intelligent personal assistant (PA) systems often use ASR to recognize a verbal command by a user to perform a specified action responsive to the command. The PAS may execute actions based on user input, location awareness, and/or the ability to access information from a variety of online sources, e.g., weather or traffic conditions, news, stock prices, user schedules, retail prices, etc.

SUMMARY

Many PA systems often only process audio data encoding utterances of a user to recognize and transcribe voice queries submitted by the user. However, if the received audio data includes high noise levels, e.g., due to background sounds, it may be difficult to accurately endpoint the audio data to identify a speech portion of the audio corresponding to the submitted voice query. As a result, many PA systems often misrecognize or transcribe audio data that includes, for example, audio data that includes audio segments that do not correspond to the user's voice query, e.g., background noise preceding or following a user's voice query.

In some implementations, a system is capable improving endpoint detection of a voice query submitted by a user. For instance, the system may initially obtain audio data encoding the submitted voice query, and video data synchronized with the obtained audio data that includes images of the user's face when submitting the voice query. The system then uses techniques to distinguish between portions of the audio data corresponding to speech input and other portions of the voice query corresponding to non-speech input, e.g., background noise. As an example, the system initially determines a sequence of video frames that includes images of a face of the user. The system then identifies a sequence of video frames that includes images of detected lip movement. In some implementations, the system determines the first and last frames of the sequence, and their corresponding time points. The system then identifies an audio segment of the audio data that has a starting and ending time point corresponding to the time points of the first and last frames of the sequence of video frames. The system endpoints the audio data to extract the audio segment and provides the audio segment for output to an ASR for transcription.

The endpointing techniques described throughout can be used to provide various advantages to PA systems. For instance, because synchronized video data is used to verify the speech portions of audio data, the endpointing techniques can be used to, for example, reduce false positive voice query detection, reduce the missed detection of specified PA system activation terms or phrases, or identify the occurrence of multiple voice commands within audio data encoding a received query. In addition, in some implementations, detected lip movement data can be used to as an independently verify speech recognition by an ASR system to reduce the likelihood of generating incorrect transcription hypotheses. For example, a baseline transcription hypothesis generated based on applying speech recognition techniques to audio data can be verified against detected lip movement data indicating terms and/or phrases spoken by the user to identify and/or correct misrecognized terms.

In one aspect, a computer-implemented method can include: receiving synchronized video data and audio data; determining that a sequence of frames of the video data includes images corresponding to lip movement on a face; endpointing the audio data based on first audio data that corresponds to a first frame of the sequence of frames and second audio data that corresponds to a last frame of the sequence of frames; generating, by an automated speech recognizer, a transcription of the endpointed audio data; and providing the generated transcription for output.

One or more implementations can include the following optional features. For instance, in some implementations, determining that the sequence of frames of the video data includes images corresponding to lip movement on a face includes: identifying one or more feature statistics for the images corresponding to the lip movement of the face; and determining that the one or more identified feature statistics include a feature statistic that is determined to represent lip movement associated speech.

In some implementations, the method further includes: determining that the video data includes user motion; and in response to determining that the video data includes user motion, determining that the sequence of frames of the video data includes images of a face.

In some implementations, the synchronized video data and audio data are received from a smartphone; and the synchronized video data is captured by a front-facing camera of the smartphone.

In some implementations, the endpointed audio data corresponds to a portion of the audio data that encodes a voice query submitted by a user.

In some implementations, the method further includes: in response to determining that the sequence of frames of the video data includes images of a face, activating a personal assistant system to process the voice query submitted by the user.

In some implementations, determining that the sequence of frames of the video data includes images corresponding to lip movement on a face includes: obtaining the sequence of frames from the video data; and processing the sequence of frames using a deep neural network configured to: receive each of the frames within the sequence of frames; and compute, for each of the frames within the sequence of frames, a confidence score that represents a likelihood that the frame includes an image corresponding to lip movement on the face.

In some implementations, the method further includes: determining that an additional sequence of frames of the video data includes images of the face, the sequence of frames including the additional sequence of frames, where determining that the sequence of frames of the video data includes images corresponding to lip movement on the face includes: in response to determining that the additional sequence of frames of the video data includes images of the face, determining that the sequence of frames of the video data includes images corresponding to lip movement on the face.

In some implementations, determining that the additional sequence of frames of the video data includes images of the face includes: obtaining the additional sequence of frames from the video data; processing the additional sequence of frames using a deep neural network configured to: receive each of the frames within the additional sequence of frames; and compute, for each of the frames within the additional sequence of frames, a confidence score that represents a likelihood that the frame includes an image of the face.

In some implementations, endpointing the audio data includes: identifying first audio data that corresponds to the first frame of the sequence of frames of the video data; identifying second audio data that corresponds to the last frame of the sequence of frames of the video data; and truncating the audio data before the first audio data and after the second audio data.

Other versions include corresponding systems, and computer programs, configured to perform the actions of the methods encoded on computer storage devices.

The details of one or more implementations are set forth in the accompanying drawings and the description below. Other potential features and advantages will become apparent from the description, the drawings, and the claims.

Other implementations of these aspects include corresponding systems, apparatus and computer programs, configured to perform the actions of the methods, encoded on computer storage devices.

BRIEF DESCRIPTION OF THE DRAWINGS

In the drawings, like reference numbers represent corresponding parts throughout.

DETAILED DESCRIPTION

In general, a system is capable of improving endpoint detection of a voice query submitted by a user to a personal assistant device. For instance, the system may initially obtain audio data encoding the submitted voice query, and synchronized video data that includes images of the user's face when submitting the voice query. The system uses techniques to distinguish between portions of the audio data corresponding to speech input and other portions of the voice query corresponding to non-speech input, e.g., background noise. As an example, the system determines a sequence of video frames that includes detected lip movement. The system identifies the first and last frames of the sequence, and their corresponding time points. The system identifies an audio segment of the audio data that has a starting and ending time point corresponding to the time points of the first and last frames of the sequence of video frames. The system endpoints the audio data by extracting the audio segment and provides the audio segment for output to an ASR for transcription.

As described throughout, an "endpoint" can refer to either a starting point or a terminating point of an audio segment. For instance, if a single audio file is endpointed using a single endpoint, then two audio segments are generated, e.g., one audio segment from the beginning of audio file to the endpoint as the terminating point, and a second audio segment from the endpoint as the starting point to the end of the audio file.

Figure 1:
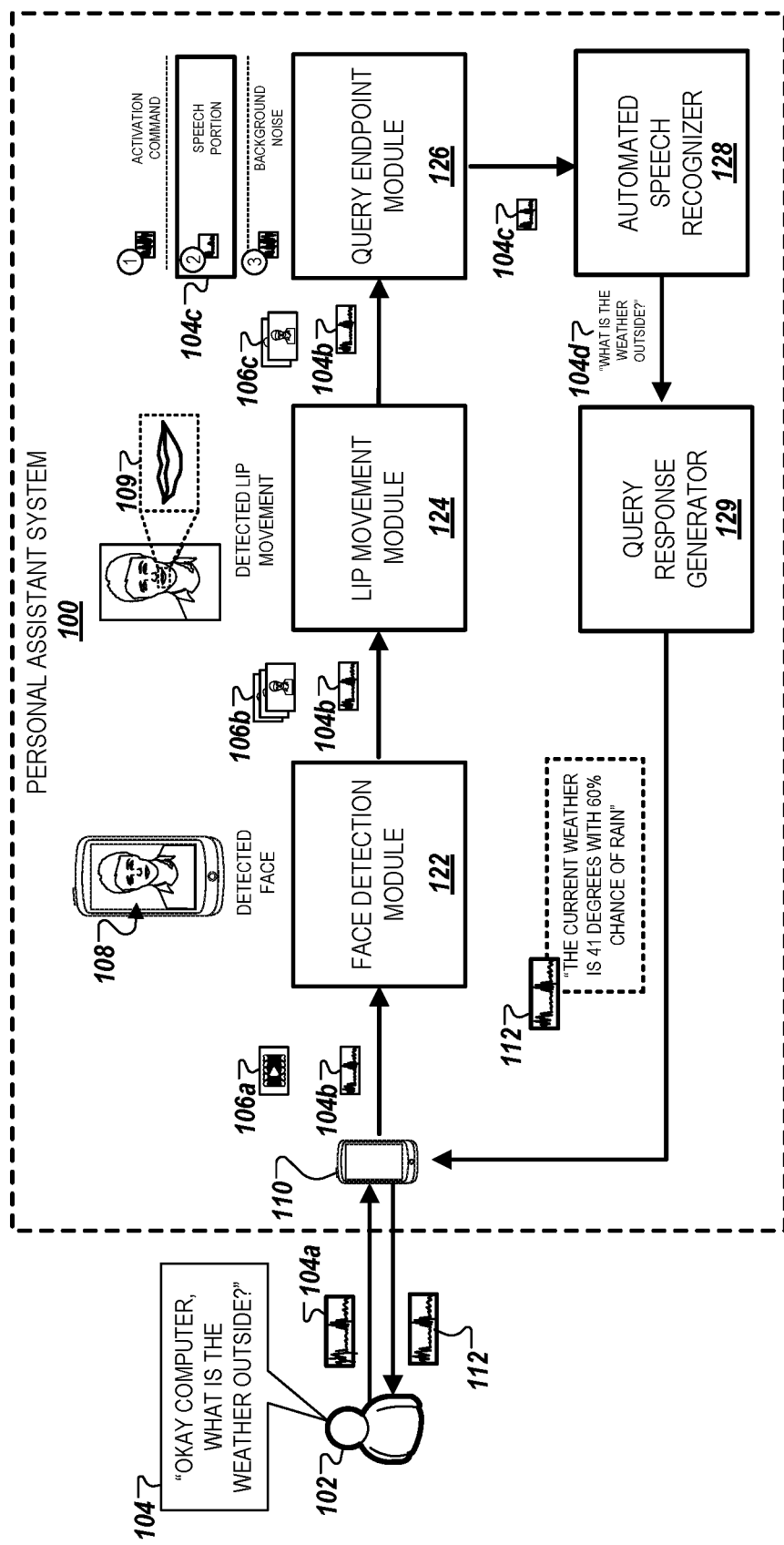
FIG. 1 illustrates an example of a system that is capable of using detected lip movement data to determine endpoints of voice query segments.

FIG. 1 illustrates an example of a PA system 100 that is capable of using detected lip movement data to determine endpoints of voice query segments. In the example, the system 100 includes a client device 110, a face detection module 122, a lip movement module 124, a query endpoint module 126, an ASR 128, and a query response generator 129.

In general, the system 100 can represent any type of intelligent personal assistant software that is capable of performing tasks such as voice interaction, music playback, making to-do lists, setting alarms, streaming audio data, providing information, e.g., weather traffic, or real time information. In some implementations, the system 100 may additionally be capable of being used as a home automation hub. The system 100 may be implemented locally on a device such as the client device 110, e.g., through a mobile application, another electronic device that communicates with the client device 110 over a local network, e.g., a Wi-Fi-enabled personal assistant device, a server associated with an application that runs on the client device 110, or a combination thereof.

The client device 110 can be any type of network-enabled personal electronic computing device. For example, the client device 110 can be one or more of a smartphone, a laptop computing device, a tablet computing device, an intelligent personal assistant device, a smart wearable device, or any other type of Internet-of-Things (IOT) capable device.

The face detection module 122, the lip movement module 124, and the query endpoint module 126, the ASR 128, and the query response, generator 129 can be software modules of the system 100 that are implemented on applicable hardware elements. For instance, in the example depicted in FIG. 1, the modules 122, 124, 126, 128 and 129 are each associated with the system 100 are executed on a server associated with the client device 110, e.g., a web server, an application server, or any other type of applicable server.

In other implementations, the face detection module 122, the lip movement module 124, the query endpoint module 126, the ASR 128, and the query response generator 129 are software modules that are each implemented on distinct hardware elements, e.g., different servers. As an example, the face detection module 122, the lip movement module 124, the query endpoint module 126, and the query response generator 129 may be implemented on a personal assistant server that obtains information responsive to commands submitted by the user, whereas the ASR 128 may be implemented with another distinct speech recognition server that recognizes and transcribes voice queries submitted by users.

In operation, a user 102 initially submits an utterance 104 on the client device 110, which is processed and encoded as audio data 104a on the client device 110. In response to receiving the utterance 104, the client device 110 may display a user interface to the user 102. For example, the user interface may provide instructions to look towards a front-facing camera of the client device 110. In other examples, the user interface may provide an alert or notification with information associated with the utterance 104, e.g., a transcription of the utterance in response to receiving the utterance 104. In some implementations, the user interface can provide a user-selectable list of device actions to be performed by the client device 110.

A camera associated with the client device 110 captures video data 106a of the user 102. In the example depicted, a front-facing camera of the client device 110 captures video data 106a of the user 102 after he/she says a designated activation term or phrase (referred to as a "hot word") that activates the system 100, e.g., the phrase "OKAY COMPUTER" within the utterance 104. In other examples, the camera associated with the client device 110 can automatically capture video once the user 102 provides input, e.g., voice input, a text input, an icon/button press, indicating that he/she is about to submit the utterance 104.

The video data 106a is captured by the camera associated with the client device 110, the captured video data 106a is processed in relation to the audio data 104a. For example, video frames within the video data 106a are synchronized with audio segments within the audio data 104a so that time points associated with the video frames where the user 102 is providing the utterance 104 are aligned with corresponding time points associated with the audio segments of the audio data 104a. The video data 106a and synchronized audio data 104b are then transmitted to the face detection module 122.

The face detection module 122 processes the video data 106a to identify a face of the user 102. The face detection module 122 can use facial recognition techniques to determine if images of the user's face are present within video frames of the video data 106a. An example of a facial recognition technique used by the face detection module 122 is the technique described by Zhu and Ramanan in a research publication titled "Face Detection, Pose Estimation, and Landmark Localization in the Wild," available at https://www.ics.uci.edu/~xzhu/paper/face-cvpr12.pdf.

In the example depicted in FIG. 1, the face detection module 122 identifies a detected face 108 within the video data 106a captured by the front-facing camera of the client device 110. Video data 106b includes a sequence of video frames that include images of the detected face 108, and the synchronized audio data 104b are then transmitted to the lip movement module 124.

The lip movement module 124 processes the video data 106b to identify a sequence of video frames within the video data 106b that includes images correspond to detected lip movement. For instance, the lip movement module 124 may iteratively compare consecutive video frames within the video data 106b of the user's face to determine if the user's lips have moved between frames. In the example depicted in FIG. 1, the lip movement module 124 determines a subset of the video frames that include images of the detected face 108 and lip movement data 109, e.g., a subset of the video data 106b where the user's lips are detected to be moving between consecutive video frames.

The lip movement module 124 determines whether the detected lip movement 109 within the identified sequence of video frames within the video data 106b are associated with, or correspond to, the user's speech. These video frames can be referred to as the speech portion of the video data 106b, and their corresponding portions within the audio data 104b can be referred to as the speech portion of the audio data 104b.

The lip movement module 124 can use various statistical techniques to compute feature statistics that indicate whether portions of the detect lip movement 109 are associated with speech. For instance, as described in detail below in FIG. 3, the lip movement module 124 may apply a variety of machine learning techniques to compute the feature statistics for the video data 106b, which are then used to distinguish between detected lip movement that is not associated with speech input and detected lip movement that corresponds to speech input. As an example, the lip movement module 124 may use a neural network architecture, such as a deep neural network (DNN) or a long short-term memory (LSTM) network, to automatically distinguish between detected lip movement that is associated with speech (or "speech-associated detected lip movement") and detected lip movement that is not associated with speech (or "non-speech-associated lip movement").

The lip movement module 124 then extracts the video frames within the video data 106b that are determined to include speech-associated detected lip movement to generate the video data 106c. The video data 106c that includes this sequence of video frames, and the synchronized audio data 104b can be transmitted to the query endpoint module 126.

The query endpoint module 126 endpoints the audio data 104b based on processing the video data 104c to identify speech portions of the synchronized audio data 104b. If the video data 106c includes a single sequence of video frames, e.g., a collection of consecutive video frames, the query endpoint module 126 endpoints the audio data 104b based on identifying the video frame within the video data 106c with the earliest time point, e.g., the starting frame, and the video frame within the video data 106c with the latest time point, e.g., the terminating frame. The query endpoint module 126 then identifies the time points within the synchronized audio data 104b that correspond to the time points of the starting and terminating frames, respectively. Multiple audio segments can be generated based on the endpointing the audio data 104b.

In the example depicted in FIG. 1, the query endpoint module 126 endpoints the audio data 104b to generate three audio segments from the audio data 104b. Of the three generated audio segments, the query endpoint module 126 determines that audio segment 104c corresponds to a speech portion based on their associated video frames within the video data 106c having detected speech-associated lip movement. In this example, the audio segment 104c corresponds to the portion within the audio data 104a where the user 102 speaks the utterance 104. The query endpoint module 126 determines that the other two audio segments, e.g., the audio segment labelled as "(1)" and the audio segment labelled as "(3)," do not represent a speech portion of the audio data 124. This is because the video frames within the video data 106a corresponding to the audio segments either include no detected lip movement, or include detected lip movement that is not associated with speech as described above. For example, the audio segment labelled as "(1)" represents a PAS activation phrase, e.g., "OKAY COMPUTER," whereas the audio segment labelled as "(3)" represents residual sound that is collected after the user 102 submits a query.

After endpointing the audio data 104b to generate the audio segments of the audio data 104b, the query endpoint module 126 then transmits the speech-associated audio segments for output to the ASR. In the example illustrated in FIG. 1, the query endpoint module 126 transmits the audio segment 104c for output to the ASR 128.

The ASR 128 transcribes the audio segment 104c and provides a transcription 104d to the query response generator 129. The query response generator 129 processes the transcription 104d as a command to perform a particular action. In the example depicted, the query response generator 129 parses the terms within the transcription and determines that the command is to provide weather information for output to the user 102. The query response generator 129 then obtains real-time weather information for the location associated with the user 102 and generates a response 112 to provide for output to the client device 110. As shown, the response 112 is then provided for output to the user 102 as a response to the command included within the transcription 104d.

In some implementations, the ASR 128 may additionally or alternatively transmit the transcription 104d to, for example, a search engine that performs a search based on the utterance transcribed within the transcription 104d. In such implementations, the utterance provided by the user 102 can be used to perform a search, e.g., a web search, or a search through a native application.

The descriptions above relate an exemplary implementation of the system 100. In other implementations, the system 100 may be configured to provide one or more optional features. In some implementations, the camera that captures the video data 106a can be distinct from the client device 110. For example, if the client device 110 is a desktop computing device or a laptop computing device, the camera can be a separate webcam facing the user as he/she uses the client device 110. In other implementations, the camera can be a device that is placed in a designated location such that the user 102 is within its field of view when the user 102 submits the utterance 104. For instance, in such implementations, the camera can be, for example, a security camera, a television camera, or some other type of stationary camera that monitors user activity within a specified region within its field of view. In each of these implementations, the captured video data 106a can be transmitted over a local network that connects the client device 110 and the camera.

In some implementations, the video data 106 can be captured by multiple devices associated with the client device 110 (including the client device 110). For example, video can be collected by a front-facing camera of the client device 110, a security camera that captures a region of a property, among others. In such implementations, the video data collected by the multiple devices can be stitched together and then transmitted to the face detection module 122 for processing.

In some implementations, the video data 106a and the audio data 104a are synchronized locally on the client device 110, e.g., when the camera that collects the video data 106a is a component of the client device 110. Alternatively, if the camera is distinct from the client device 110, the synchronization can either be performed by the camera or another processing device, e.g., a server on which the face detection module 122 and/or the lip movement module 124 operates.

In addition, the system 100 may perform the synchronization operation at various time points of processing data associated with the utterance 104. For instance, in the example depicted in FIG. 1, the system 100 synchronizes the video data 106a and the audio data 104a prior to determining if a face of the user 102 is detected within the video data 106a. In this example, the synchronization can be based on, for example, comparing audio associated with the video data 106a captured by a camera associated with the client device 110 and the audio data 104a captured by a microphone associated with the client device 110.

Alternatively, in other implementations, the system 100 performs the synchronization operation at any time point prior to performing query endpointing, e.g., after face detection but before lip movement detection, or after lip movement detection but before query endpointing. In such implementations, the synchronization operation can be performed by the face detection module 122, the lip detection movement module 124, the query endpoint module 126, or a combination thereof.

In some implementations, after detecting the face of the user 102, the face detection module 122 may process the video data 106a. Examples of processing operations performed by the face detection module 122 include reducing the field of view of the video data 106a to correspond to the detected face, adjusting visual attributes of the video data 106a to improve feature detection, e.g., brightness, contrast, color ratio, hue, saturation, etc., and/or tagging locations of facial features, e.g., eyes, lips, nose, within the field of view of the video data 106a.

In some implementations, the detected lip movement data 109 can be used to independently verify the recognition and/or transcription of the utterance 104 by the system 100. For instance, the lip movement module 124 may be capable of identifying lip movement patterns within the detected lip movement 109, and then determining terms and/or phrases that are predetermined to be associated with the identified lip movement patterns. The lip movement module 124 then uses this technique to recognize terms and/or phrases that were said by the user 102 in the utterance 104. In such implementations, the lip movement module 124 is capable of identifying terms and/or phrases that were said by the user 102 without the use of an acoustic model. In this regard, the system 100 can generate transcription hypothesis for the utterance 104 based on the detected lip movement 109, and determine whether transcription hypotheses based on the detected lip movement 109 coincide with recognition hypotheses for the utterance 104 based solely on the audio data 104a, e.g., through the use of an acoustic model and a language model. In this regard, the lip movement detection techniques described above can be used to reduce the likelihood of, for example, generating incorrect transcriptions due to background noise, false or missed hot word detections, and/or mistakenly transcribing multiple sequential queries as a single query.

In some implementations, the lip movement module 124 and/or query endpoint module 126 can use the lip movement detection and query endpointing techniques described above to parse a transcription of larger query into multiple transcriptions of sub-queries. For example, a larger query may be "OKAY COMPUTER, WHAT IS THE WEATHER OUTSIDE? I'M LATE FOR WORK." After generating a transcription for the entire speech portion, the system 100 may determine that the utterance 104 include three sub-queries: "OKAY COMPUTER," "WHAT IS THE TEMPERATURE," and "I'M LATE FOR WORK." This determination may be based on the identification of video frames within the video data 106a having detected lip movement that are associated with transitions in speech phrases, e.g., limited lip movement between phrases.

Figure 2:
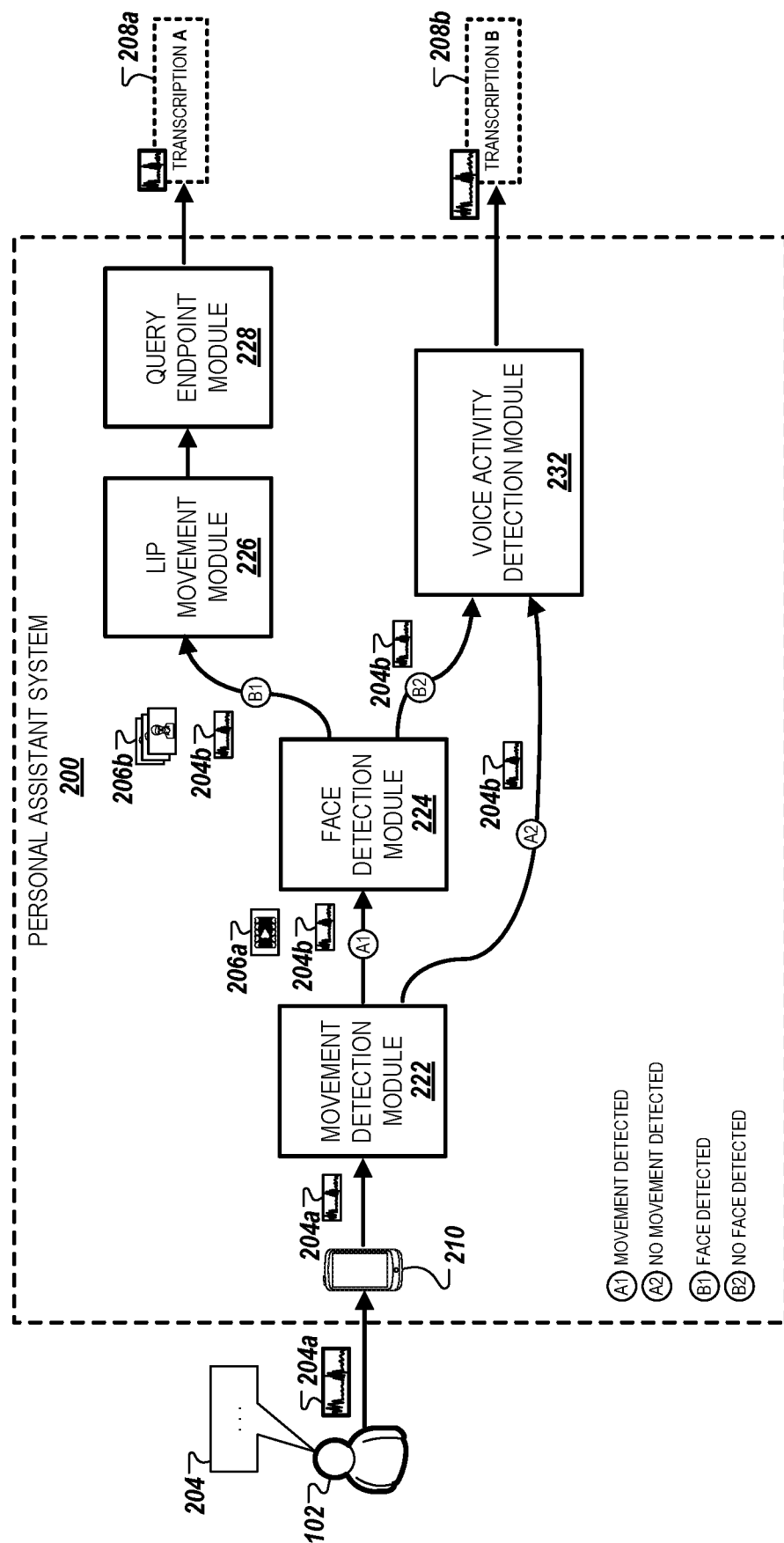
FIG. 2 illustrates an example of a system that is capable of selectively processing a voice query using alternative transcription techniques.

FIG. 2 illustrates an example of a personal assistant system (PAS) 200 that is capable of selectively processing a query using alternative transcription techniques. In the example, the system 200 includes a client device 210, a movement detection module 222, a face detection module 224, a lip movement module 226, a query endpoint module 228, and a voice activity detection module 232.

In some implementations, components of the system 200 perform substantially similar operations as the components of the system 100. For example, the functions performed by the client device 210, the face detection module 224, the lip movement module 226, the query endpoint module 228, and the voice activity detection module 232 are substantially similar to those of the client device 110, face detection module 122, the lip movement module 124, the query endpoint module 126, and the voice activity detection module 128.

In addition, in some implementations, a system may incorporate a combination of features of the system 100 and the system 200. In such implementations, the system may be capable of using facial recognition and lip movement data to process a received user query, as described above with respect to FIG. 1, and using selective transcription processing techniques based on whether the user's face and/or the user's movement are detectable when the user query is received, as described below with respect to FIG. 2.

In general, the system 200 uses alternative transmission pathways to process data associated with a user-submitted utterance 204 using different techniques. For instance, in one transmission pathway defined by paths "A1" and "B1," the system 200 uses detected lip movement data, e.g., the lip movement data 109, to improve speech recognition of the utterance 204 in a manner similar to the techniques described above with respect to FIG. 1.

Alternatively, in another transmission pathway defined by paths "A1" and "B1," the system 200 only processes audio data 204a encoding the utterance 204a using the voice activity detection module 232 as a default speech recognition module. In this transmission pathway, the system 200 does not process video data because a user's face is unable to be detected at the time the utterance 204 is submitted. In yet another transmission pathway defined by path "A2," the system 200 similarly processes the audio data 204a using the voice activity detection module 232. In this transmission pathway, the system 200 does not process video data because no motion is detected nearby a client device 210 that receives the audio data 204a, indicating that a user's face is not likely to be detected within any collected video data. Motion can be detected if, for example, a threshold number of pixels within the video data have been determined to change between sequential frames. In other examples, motion can be detected based on using object recognition and/or detection techniques within a field of view of the video and tracking a reference point within the video associated with a detected object within the video. In some implementations, the video data can be processed to distinguish between certain types of motion, e.g., detected motion associated with lip movement and detected motion that is not associated with lip movement.

Referring now to the example depicted in FIG. 2, the user 102 initially submits a query 204 to the client device 210, which is encoded as audio data 204a on the client device 210. The client device 210 receives the audio data 204a, the movement detection module 222 determines if there is movement detected near a vicinity of the client device 210. For example, the movement detection module 222 can be a motion sensor placed in a region of a property where the client device 210 is located when the user 102 submits the voice utterance 204.

The movement detection module 222 detects motion near the client device 210 to determine if a captured video of the user 102, as described above with respect to FIG. 1, is likely to include a face of the user 102. As depicted in FIG. 2, if the movement detection module 222 detects motion within a vicinity of the client device 210, then the system 200 proceeds with transmission pathway "A1" and generates an instruction to enable a camera associated with the client device 210 to capture video data 206a. The camera can capture the video data 206a in a manner similar to the techniques described in FIG. 1 with respect to capturing the video data 106a. In this example, the motion detection module 222 can be used to selectively trigger video capturing by the camera in order to, for example, conserve the camera's battery life and reduce the camera's power consumption by not requiring the camera to be constantly capturing video data.

Alternatively, if the movement detection module 122 is unable to detect motion near the vicinity of the client device 210, the system 200 proceeds with transmission pathway "A2" and transmits the audio data 204a to the voice activity detection module 232 without instructing the camera to collect video data as described above. Details relating to the operations of the voice activity detection module 232 are provided in greater detail below.

In some implementations, the system 200 does not include the movement detection module 222. In such implementations, the client device 210 transmits the audio data 204a and the captured video data 206a directly to the face detection module 224. For example, the camera associated with the client device 210 initially collects the video data 206a once the client device 210 receives the audio data 204a. The face detection module 224 then processes the captured video data 206a to determine if a face of the user 102 can be detected within a field of view of the captured video data 206a using the facial recognition techniques described above with respect to FIG. 1.

The face detection module 224 determines if the captured video data 206a associated with the utterance 204 includes a face of the user 102. As depicted in FIG. 2, if the face detection module 224 determines that the face of the user 102 is detected within the captured video data 206a, then the system 200 proceeds with transmission pathway "B1" and proceeds to perform the operations described above with respect to FIG. 1. For example, the face detection module 224 transmits the video data 206b and the audio data 204a to the lip movement module 226, which then synchronizes the video data and the audio data and identifies detected lip movement data, e.g., the lip movement data 109, as described above. The query endpoint module 228 then segments the synchronized audio data based on the detected lip movement data, and generates a transcription 208a for an audio segment as shown in the example of FIG. 1.

Alternatively, if the face detection module 224 is unable to detect a face of the user 102 within the video data 206a, the system 200 proceeds with transmission pathway "B2" and transmits the audio data 204a to the voice activity detection module 232 without performing the video processing techniques shown in the example of FIG. 1.

Once the system 200 proceeds with either of the transmission pathways "A2" or "B2," the audio data 204a is transmitted to the voice activity detection module 232. As described throughout, the voice activity detection module 232 may be, for example, an ASR that uses an acoustic model and an associated language model to phonetically transcribe a voice query such as the utterance 204. For example, the voice activity detection module 232 generates a transcription 208b for the utterance 204 based on processing the phonetic attributes included within the audio data 204a.

In some implementations, the system 200 executes transmission pathways "B1" and "B2" in parallel. In such implementations, data collected in one transmission pathway can be used to improve and/or supplement data processing in the alternative transmission pathway. For example, if the user's face disappears during portions of the video within the video data 206a, then data generated by the voice activity detection module 232 can be used to supplement the processing operations by the lip movement module 226 and the query endpoint module 228 as described above.

Figure 3:
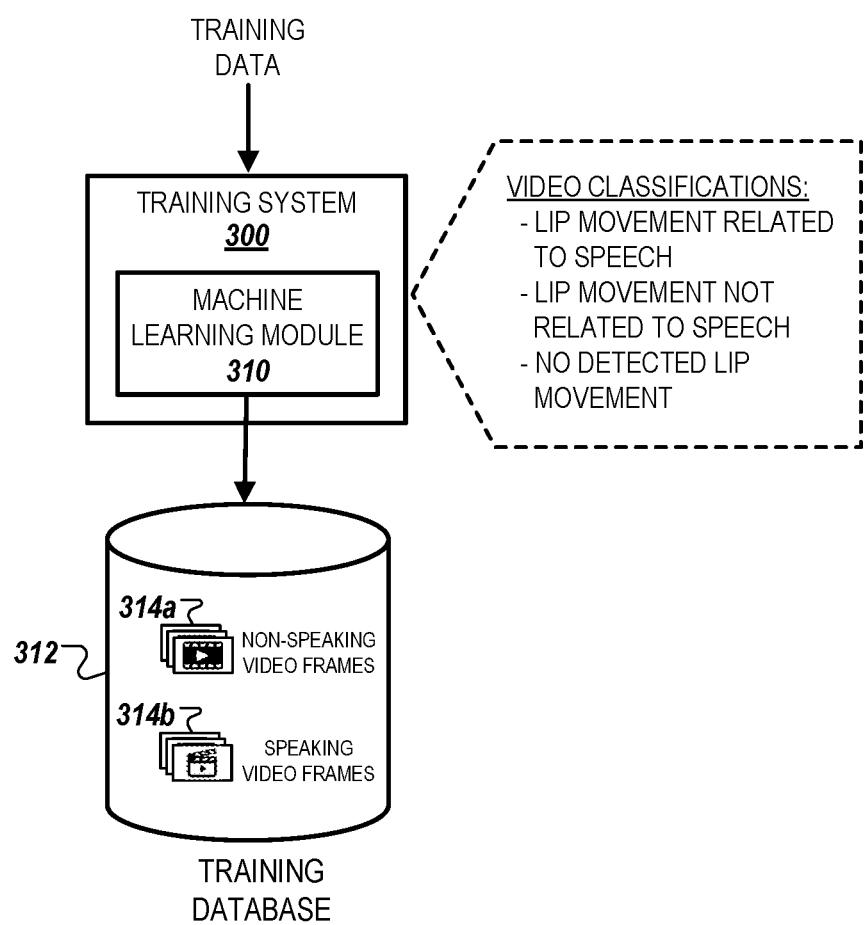
FIG. 3 illustrates an example of a system that can be used to train the systems illustrated in FIG. 1 or 2.

FIG. 3 illustrates an example of a training system 300 that can be used to train the systems 100 and 200 illustrated in FIGS. 1 and 2, respectively. The system 300 includes a machine learning module 310 that can be used to train the various components of the systems 100 and 200. The machine learning module 310 may train, for example, the face detection modules 122 and 224 to automatically detect faces within collected video data, e.g., the video data 106a and 206a, the lip movement modules 124 and 226 to automatically detect lip movement data, e.g., the lip movement data 109, within video data, e.g., the video data 106b and 206b, or the movement detection module 222 in detecting motion near a vicinity of the client device 210.

The machine learning module 310 may also be any suitable machine learning models that employ multiple layers of operations to predict one or more outputs from one or more inputs. For example, the machine learning model 310 may include one or more hidden layers situated between an input layer and an output layer. The output of each layer can then be used as input to another layer in the network, e.g., the next layer or the output layer. In some implementations, the machine learning module 310 can include, for example, a convolutional neural network (CNN), long short-term memory (LSTM) network, or a combination thereof.

To train the various components of the systems 100 and 200, the machine learning module 310 can use various statistical classification techniques to determine if received video data at various processing stages, e.g., the captured video data 106a or the video data 106b, include features that are predetermined to be associated with a set of manually classified video frames. In the example depicted in FIG. 3, the machine learning module 310 accesses a training database 312 that includes non-speaking video frames 314a and speaking video frames 314b.

The non-speaking video frames 314a correspond to video frames of users that are determined not to correspond to speech portions of a user query. For instance, the non-speaking video frames 314a can either include video frames in which no lip movement is detected for a user, or video frames where lip movement is detected but the detected lip movement is not associated with speech, e.g., lip movement as a user is eating, lip movement associated with a user's coughing, etc. The speaking video frames 314b, in contrast, correspond to video frames of users that are determined to correspond to speech portions of a user query.

In some implementations, each of the video frames 314b can be associated with a word and/or phrase that a user spoke when a video frame was collected of the user. For example, video frames included within a video of a user providing the voice query "HELLO" can be associated with the term "HELLO." In such implementations, the machine learning module 310 may train the lip movement modules 124 and 226 to not only determine the speech portions of a query using the techniques described above, but also perform speech recognition techniques to identify a term or phrase spoken by a user based on using pattern matching techniques associated with detected lip movement data. As an example, if the lip movement module 124 determines that a frame sequence of the video data 106b includes a lip movement pattern that is associated with the phrase "OKAY COMPUTER," then the lip movement module 124 may determine, independently of the audio data 104a, that the user has said the phrase "OKAY COMPUTER" during a time sequence corresponding to the frame sequence.

Figure 4:
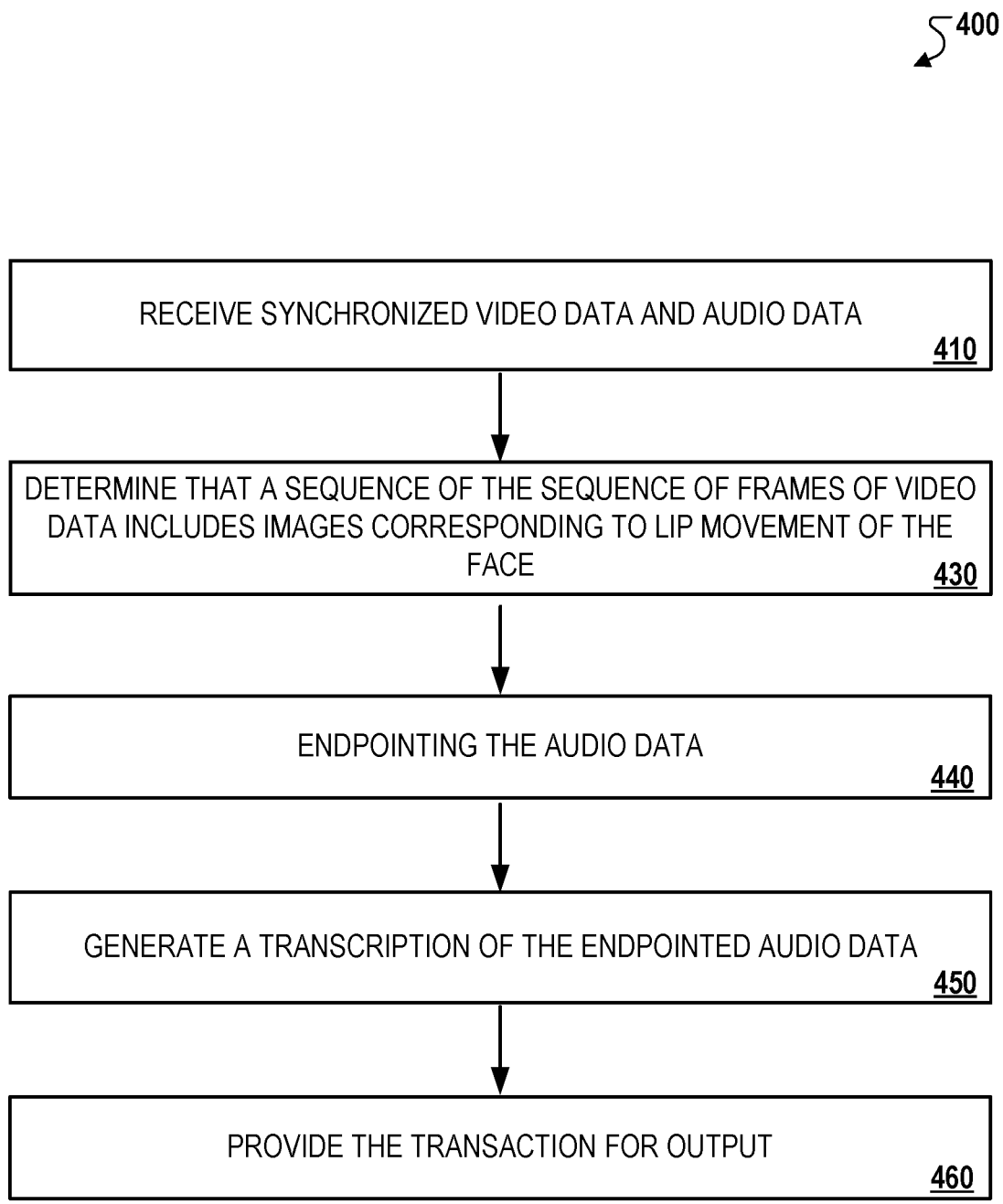
FIG. 4 illustrates an example of a process for determining endpoints of voice query segments based on detected lip movement data.

FIG. 4 illustrates an example of a process 400 for determining endpoints of voice query segments based on detected lip movement data. Briefly, the process 400 can include receiving synchronized video data and audio data (410), determining that a sequence of frames of video data includes images corresponding to lip movement of the face (420), endpointing the audio data (430), generating a transcription of the endpointed audio data (440), and providing the transcription for output (450).

In more detail, the process 400 can include receiving synchronized video data and audio data (410). For instance, the face detection module 122 may receive the video data 106a and the audio data 104a that is synchronized with the video data 106a. The audio data and video data can be synchronized, for example, locally on the client device 110 or remotely on a server using the face detection module 122. As described above, the synchronization process involves identifying corresponding time points within the audio 104a and the video data 106a or based on, for example, aligning the audio of the audio data 104a and the audio of the video data 104b.

In some implementations, the process 400 can additionally include determining that a sequence of frames of the video includes images of a face. In such implementations, the face detection module 122 determines that a sequence of frames of the video data 106a includes images of a detected face 108 of the user 102. As described above, the face detection module 122 may use various facial recognition techniques to determine if frames of the video data 106a include features that are associated with the detected face 108.

The process 400 can include determining that a sequence of frames of video data includes images corresponding to lip movement of the face (420). For instance, in response to determining that the sequence of frames of the video data 106a includes images of a detected face 108 of the user 102, the lip movement module 124 determines that the video data 106b, which includes frames with images of the detected face 108, includes a sequence of frames that includes detected lip movement 109. The lip movement module 124 then classifies the detected lip movement 109 to identify the frames of the video data 106b with speech-associated lip movement, e.g., the speech portion of the video data 106b. As described above, the speech portion of the video data 106b generally refers to video frames within the video data 106b where the user 102 provides some type of spoken input, e.g., saying a hot word, providing a voice query, etc.

The process 400 can include endpointing the audio data (430). For instance, the query endpoint module 126 endpoints the audio data 104b based on a starting point and a terminating point of an audio segment such as the audio segment 104c. As illustrated in the example of FIG. 1, the query endpoint module 126 endpoints the audio data 104b to generate three audio segments. In this example, the audio segment 104c corresponds to the sequence of frames including speech-associated lip movement as determined in step 430. The audio segment 104c corresponds to the query submitted by the user 102, whereas the two other audio segments represent a PAS activation command (e.g., "OKAY COMPUTER"), or other types of non-speech audio such as background noise. In this example, although the user's lips are moving during the audio segment corresponding to the PAS activation command, this segment is still not processed by the query endpoint module 126 because it is unrelated to the query submitted by the user.

The process 400 can include generating a transcription of the endpointed audio data (440). For instance, the ASR 128 generates the transcription 104*d* of the audio segment 104*c*, which represents the endpointed audio data. As described in the example of FIG. 1, the audio segment 104*c* is selected for transcription because it is determined to represent the speech portion of the audio data 104*a* for a query 104.

The process 400 can include providing the transcription for output (450). For instance, the automated speech recognizer provides the transcription 104*d* for output to the query response generator 129. In the example depicted in FIG. 1, the query response generator 129 then generates a response 112 that the client device 110 provides as output to the user 102.

Figure 5:
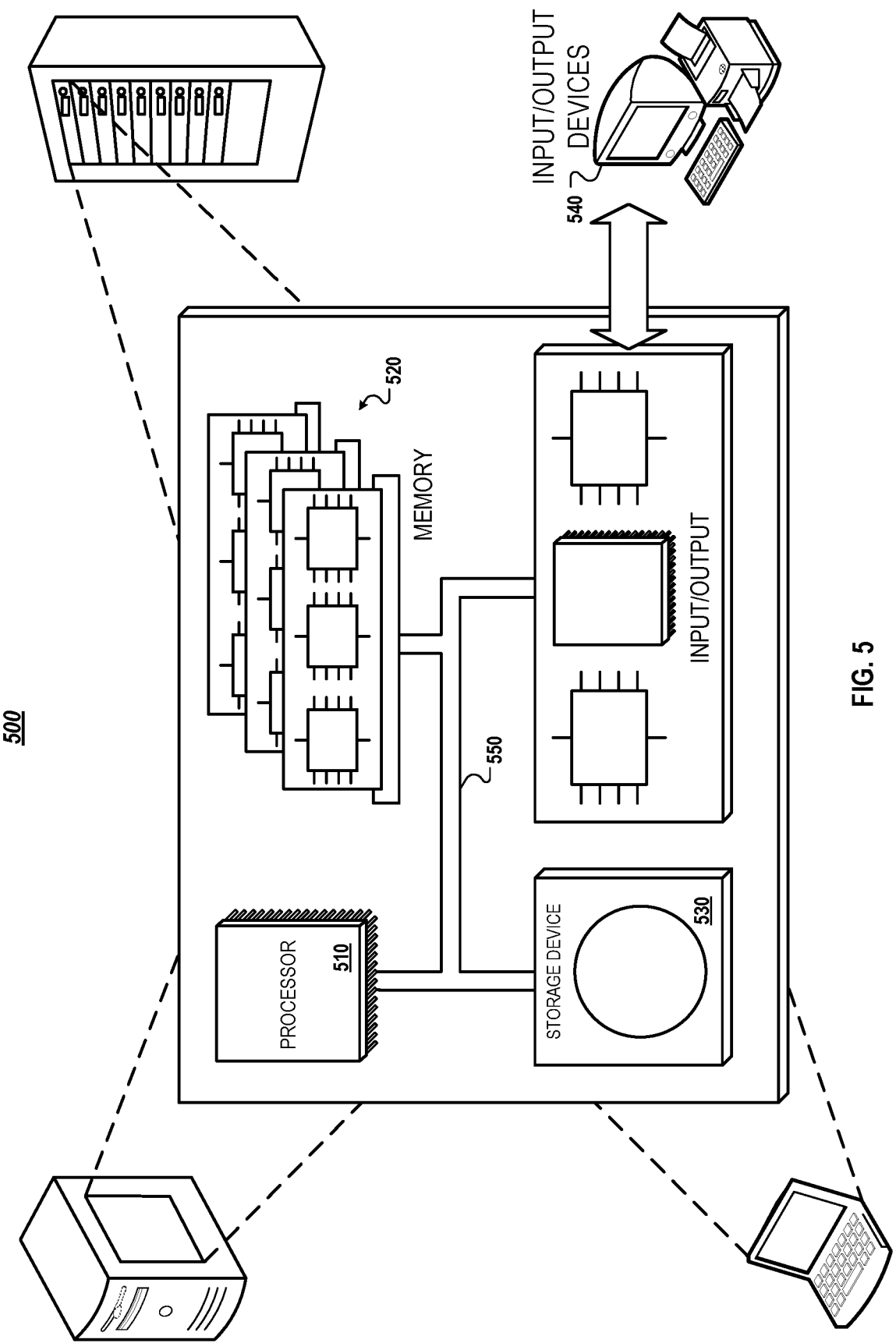
FIG. 5 illustrates examples of computing devices on which the processes described herein, or portions thereof, can be implemented.

FIG. 5 is a block diagram of computing devices 500, 550 that can be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally, computing device 500 or 550 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and can be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses can be used, as appropriate, along with multiple memories and types of memory. Also, multiple computing devices 500 can be connected, with each device providing portions of the necessary operations, e.g., as a server bank, a group of blade servers, or a multi-processor system.

The memory 504 stores information within the computing device 500. In one implementation, the memory 504 is a volatile memory unit or units. In another implementation, the memory 504 is a non-volatile memory unit or units. The memory 504 can also be another form of computer-readable medium, such as a magnetic or optical disk.

The storage device 506 is capable of providing mass storage for the computing device 500. In one implementation, the storage device 506 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth intensive operations. Such allocation of functions is exemplary only. In one implementation, the high-speed controller 508 is coupled to memory 504, display 516, e.g., through a graphics processor or accelerator, and to high-speed expansion ports 510, which can accept various expansion cards (not shown). In the implementation, low-speed controller 512 is coupled to storage device 506 and low-speed expansion port 514. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 500 can be implemented in a number of different forms, as shown in the figure. For example, it can be implemented as a standard server 520, or multiple times in a group of such servers. It can also be implemented as part of a rack server system 524. In addition, it can be implemented in a personal computer such as a laptop computer 522. Alternatively, components from computing device 500 can be combined with other components in a mobile device (not shown), such as device 550. Each of such devices can contain one or more of computing device 500, 550, and an entire system can be made up of multiple computing devices 500, 550 communicating with each other.

The computing device 500 can be implemented in a number of different forms, as shown in the figure. For example, it can be implemented as a standard server 520, or multiple times in a group of such servers. It can also be implemented as part of a rack server system 524. In addition, it can be implemented in a personal computer such as a laptop computer 522. Alternatively, components from computing device 500 can be combined with other components in a mobile device (not shown), such as device 550. Each of such devices can contain one or more of computing device 500, 550, and an entire system can be made up of multiple computing devices 500, 550 communicating with each other.

Computing device 550 includes a processor 552, memory 564, and an input/output device such as a display 554, a communication interface 666, and a transceiver 568, among other components. The device 550 can also be provided with a storage device, such as a microdrive or other device, to provide additional storage. Each of the components 550, 552, 564, 554, 566, and 568, are interconnected using various buses, and several of the components can be mounted on a common motherboard or in other manners as appropriate.

The processor 552 can execute instructions within the computing device 550, including instructions stored in the memory 564. The processor can be implemented as a chipset of chips that include separate and multiple analog and digital processors. Additionally, the processor can be implemented using any of a number of architectures. For example, the processor 510 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 550, such as control of user interfaces, applications run by device 550, and wireless communication by device 550.

Processor 552 can communicate with a user through control interface 458 and display interface 456 coupled to a display 554. The display 554 can be, for example, a TFT (Thin-Film-Transistor Liquid Crystal Display) display or an OLED (Organic Light Emitting Diode) display, or other appropriate display technology. The display interface 556 can comprise appropriate circuitry for driving the display 554 to present graphical and other information to a user. The control interface 558 can receive commands from a user and convert them for submission to the processor 552. In addition, an external interface 562 can be provide in communication with processor 552, so as to enable near area communication of device 550 with other devices. External interface 562 can provide, for example, for wired communication in some implementations, or for wireless communication in other implementations, and multiple interfaces can also be used.

The memory 564 stores information within the computing device 550. The memory 564 can be implemented as one or more of a computer-readable medium or media, a volatile memory unit or units, or a non-volatile memory unit or units. Expansion memory 574 can also be provided and connected to device 550 through expansion interface 572, which can include, for example, a SIMM (Single In Line Memory Module) card interface. Such expansion memory 574 can provide extra storage space for device 550, or can also store applications or other information for device 550. Specifically, expansion memory 574 can include instructions to carry out or supplement the processes described above, and can include secure information also. Thus, for example, expansion memory 574 can be provide as a security module for device 550, and can be programmed with instructions that permit secure use of device 550. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that can be received, for example, over transceiver 568 or external interface 562.

Device 550 can communicate wirelessly through communication interface 566, which can include digital signal processing circuitry where necessary. Communication interface 666 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 668. In addition, short-range communication can occur, such as using a Bluetooth, Wi-Fi, or other such transceiver (not shown). In addition, GPS (Global Positioning System) receiver module 570 can provide additional navigation- and location-related wireless data to device 550, which can be used as appropriate by applications running on device 550.

Device 550 can also communicate audibly using audio codec 560, which can receive spoken information from a user and convert it to usable digital information. Audio codec 560 can likewise generate audible sound for a user, such as through a speaker, e.g., in a handset of device 550. Such sound can include sound from voice telephone calls, can include recorded sound, e.g., voice messages, music files, etc. and can also include sound generated by applications operating on device 550.

The computing device 550 can be implemented in a number of different forms, as shown in the figure. For example, it can be implemented as a cellular telephone 580. It can also be implemented as part of a smartphone 582, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computer-implemented method comprising:
    receiving, by one or more computing devices, video data and audio data that is synchronized with the video data;
    determining, by one or more computing devices, that a sequence of video frames of the video data includes a representation of a face with moving lips;
    determining, by the one or more computing devices and based on analyzing the video data, that the moving lips in the sequence of video frames are associated with an activity other than speech; and
    based on determining that the moving lips in the sequence of video frames are associated with an activity other than speech, bypassing, by the one or more computing devices, performing speech recognition on audio data that is synchronized with the sequence of video frames.

2. The method of claim 1, wherein:
    the video data and the audio data that is synchronized with the video data are received from a smartphone; and
    the video data is captured by a front-facing camera of the smartphone.

3. The method of claim 1, comprising:
    determining that the video data includes user motion; and
    in response to determining that the video data includes user motion, determining that the sequence of video frames includes the representation of the face with moving lips.

4. The method of claim 1, wherein determining that the sequence of video frames of the video data includes a representation of a face with moving lips comprises:
    identifying one or more feature statistics for the representation of the face with moving lips; and
    providing the sequence of video frames as input to a model that is trained to determine whether the one or more feature statistics identified for the representation of the face with moving lips include a feature statistic for lip movement associated with speech.

5. The method of claim 1, wherein determining that the sequence of video frames includes the representation of a face with moving lips comprises:
    obtaining multiple subsets of consecutive video frames of the video data; and
    processing each of the subsets of consecutive video frames of the video data using a deep neural network configured to:
        receive each subset of consecutive video frames;
        compute, for each subsets of consecutive video frames, a confidence score that represents a likelihood that the subset of consecutive video frames includes a representation of the face with moving lips; and
        determine that each confidence score satisfies a confidence score threshold.

6. The method of claim 1, wherein determining that the moving lips in the sequence of video frames are associated with the activity other than speech comprises:
    obtaining multiple subsets of consecutive video frames of the sequence of video frames;
    processing each of the subsets of consecutive video frames of the sequence of video frames using a deep neural network configured to:
        receive each subset of consecutive video frames of the sequence of video frames;
        compute, for each subset of consecutive video frames of the sequence of video frames, a confidence score that represents a likelihood that the subset of consecutive video frames includes a representation of the face with lip movement associated with speech; and
        determine that each confidence score does not satisfy a confidence threshold.

7. The method of claim 1, wherein bypassing performing speech recognition on audio data that is synchronized with the sequence of video frames comprises preventing generating a transcription of the audio data by an automated speech recognizer.

8. The method of claim 1, wherein:
    the audio data comprises a speech portion corresponding to a voice query provided by a user associated with the face; and
    determining that the moving lips in the sequence of video frames are associated with an activity other than speech comprises:
        determining that the audio data that is synchronized with the sequence of video frames is not included in the speech portion corresponding to the voice query provided by the user associated with the face.

9. A system comprising:
    one or more computing devices; and
    one or more storage devices storing instructions that are operable, when executed by the one or more computing devices, to cause the one or more computing devices to perform operations comprising:
        receiving, by one or more computing devices, video data and audio data that is synchronized with the video data;
        determining, by one or more computing devices, that a sequence of video frames of the video data includes a representation of a face with moving lips;
        determining, by the one or more computing devices and based on analyzing the video data, that the moving lips in the sequence of video frames are associated with an activity other than speech; and
        based on determining that the moving lips in the sequence of video frames are associated with an activity other than speech, bypassing, by the one or more computing devices, performing speech recognition on audio data that is synchronized with the sequence of video frames.

10. The system of claim 9, wherein:
    the video data and the audio data that is synchronized with the video data are received from a smartphone; and
    the video data is captured by a front-facing camera of the smartphone.

11. The system of claim 9, wherein the operations further comprise:

determining that the video data includes user motion; and
in response to determining that the video data includes user motion, determining that the sequence of video frames includes the representation of the face with moving lips.

12. The system of claim 9, wherein determining that the sequence of video frames of the video data includes a representation of a face with moving lips comprises:
identifying one or more feature statistics for the representation of the face with moving lips; and
providing the sequence of video frames as input to a model that is trained to determine whether the one or more feature statistics identified for the representation of the face with moving lips include a feature statistic for lip movement associated with speech.

13. The system of claim 9, wherein determining that the sequence of video frames includes the representation of a face with moving lips comprises:
obtaining multiple subsets of consecutive video frames of the video data; and
processing each of the subsets of consecutive video frames of the video data using a deep neural network configured to:
receive each subset of consecutive video frames;
compute, for each subsets of consecutive video frames, a confidence score that represents a likelihood that the subset of consecutive video frames includes a representation of the face with moving lips; and
determine that each confidence score satisfies a confidence score threshold.

14. The system of claim 9, wherein determining that the moving lips in the sequence of video frames are associated with the activity other than speech comprises:
obtaining multiple subsets of consecutive video frames of the sequence of video frames;
processing each of the subsets of consecutive video frames of the sequence of video frames using a deep neural network configured to:
receive each subset of consecutive video frames of the sequence of video frames;
compute, for each subset of consecutive video frames of the sequence of video frames, a confidence score that represents a likelihood that the subset of consecutive video frames includes a representation of the face with lip movement associated with speech; and
determine that each confidence score does not satisfy a confidence threshold.

15. A non-transitory computer-readable storage device encoded with computer program instructions that, when executed by one or more computers, cause the one or more computers to perform operations comprising:
receiving, by one or more computing devices, video data and audio data that is synchronized with the video data;
determining, by one or more computing devices, that a sequence of video frames of the video data includes a representation of a face with moving lips;
determining, by the one or more computing devices and based on analyzing the video data, that the moving lips in the sequence of video frames are associated with an activity other than speech; and
based on determining that the moving lips in the sequence of video frames are associated with an activity other than speech, bypassing, by the one or more computing devices, performing speech recognition on audio data that is synchronized with the sequence of video frames.

16. The non-transitory computer-readable storage device of claim 15, wherein:
the video data and the audio data that is synchronized with the video data are received from a smartphone; and
the video data is captured by a front-facing camera of the smartphone.

17. The non-transitory computer-readable storage device of claim 15, wherein the operations further comprise:
determining that the video data includes user motion; and
in response to determining that the video data includes user motion, determining that the sequence of video frames includes the representation of the face with moving lips.

18. The non-transitory computer-readable storage device of claim 15, wherein determining that the sequence of video frames of the video data includes a representation of a face with moving lips comprises:
identifying one or more feature statistics for the representation of the face with moving lips; and
providing the sequence of video frames as input to a model that is trained to determine whether the one or more feature statistics identified for the representation of the face with moving lips include a feature statistic for lip movement associated with speech.

19. The non-transitory computer-readable storage device of claim 15, wherein determining that the sequence of video frames includes the representation of a face with moving lips comprises:
obtaining multiple subsets of consecutive video frames of the video data; and
processing each of the subsets of consecutive video frames of the video data using a deep neural network configured to:
receive each subset of consecutive video frames;
compute, for each subsets of consecutive video frames, a confidence score that represents a likelihood that the subset of consecutive video frames includes a representation of the face with moving lips; and
determine that each confidence score satisfies a confidence score threshold.

20. The non-transitory computer-readable storage device of claim 15, wherein bypassing performing speech recognition on audio data that is synchronized with the sequence of video frames comprises preventing generating a transcription of the audio data by an automated speech recognizer.

* * * * *